United States Patent
Lin et al.

(10) Patent No.: US 10,389,167 B2
(45) Date of Patent: Aug. 20, 2019

(54) POWER DISTRIBUTION SYSTEM USING MULTIPLE RECHARGEABLE POWER SOURCES AND METHOD FOR DISTRIBUTING POWER USING MULTIPLE RECHARGEABLE POWER SOURCES

(71) Applicant: Automotive Research & Testing Center, Changhua Hsien (TW)

(72) Inventors: Po-Hsu Lin, Changhua Hsien (TW); Chung-Che Huang, Changhua Hsien (TW)

(73) Assignee: Automotive Research & Testing Center, Changhua Hsien (TW)

( * ) Notice: Subject to any disclaimer, the term of this patent is extended or adjusted under 35 U.S.C. 154(b) by 21 days.

(21) Appl. No.: 15/854,436

(22) Filed: Dec. 26, 2017

(65) Prior Publication Data

US 2019/0199121 A1   Jun. 27, 2019

(51) Int. Cl.
| | |
|---|---|
| *H02J 7/00* | (2006.01) |
| *H02J 7/14* | (2006.01) |
| *H02J 7/32* | (2006.01) |
| *B60R 16/033* | (2006.01) |

(52) U.S. Cl.
CPC .......... *H02J 7/1492* (2013.01); *B60R 16/033* (2013.01); *H02J 7/0054* (2013.01); *H02J 7/1423* (2013.01); *H02J 7/32* (2013.01)

(58) Field of Classification Search
CPC ........ H02J 7/0093; H02J 7/008; H02J 7/0086; H01M 10/44; Y02E 60/12
USPC .......................................................... 320/138
See application file for complete search history.

(56) References Cited

U.S. PATENT DOCUMENTS

| | | | | |
|---|---|---|---|---|
| 2012/0256568 | A1* | 10/2012 | Lee ..................... | H02J 7/0024 318/139 |
| 2012/0319470 | A1* | 12/2012 | Oberti .................. | B60L 1/00 307/9.1 |
| 2013/0063091 | A1* | 3/2013 | Nishi .................... | H02J 7/0016 320/126 |
| 2013/0200902 | A1* | 8/2013 | Kurimoto ........... | H01M 2/1077 324/430 |

* cited by examiner

*Primary Examiner* — Arun C Williams
(74) *Attorney, Agent, or Firm* — C. G. Mersereau; DeWitt LLP

(57) ABSTRACT

A method for distributing power using multiple power sources is performed by a control device electrically connected to multiple rechargeable power units and a load. The control device creates an output power reference table according to multiple power setting values, output power ranges and battery efficiencies of the multiple rechargeable power units. The output power reference table includes the power setting values and power distribution information corresponding to the power setting values. When receiving a consumed power value of the load, the control device selects corresponding power setting value and power distribution information in the output power reference table and controls the multiple rechargeable power units to simultaneously output power to the load according to the power distribution information. By referring to the output power values of all the rechargeable power units and allocating power outputted from all the rechargeable power units, power utilization efficiency can be enhanced.

10 Claims, 3 Drawing Sheets

POWER DISTRIBUTION SYSTEM USING MULTIPLE RECHARGEABLE POWER SOURCES AND METHOD FOR DISTRIBUTING POWER USING MULTIPLE RECHARGEABLE POWER SOURCES

BACKGROUND OF THE INVENTION

1. Field of the Invention

The present invention relates to a power distribution system and, more particularly, to a power distribution system using multiple rechargeable power sources and a method for distributing power using multiple rechargeable power sources.

2. Description of the Related Art

The demand for petrochemical energy increases with the degree of global industrialization. However, the outcome of overexploiting petrochemical energy will exhaust petroleum reserves sooner or later. Hence, seeking alternative energy becomes a direct concern to mitigate the issue of oil storage shortage arising from the overexploitation. The available alternative energy includes nuclear, solar, wind, tidal, geothermal and hydrogen energy.

As alternative energy brings forth convenience and benefits, the government of every country encourages corporate firms and home owners for choices of alternative energy, not only saving the cost of their electricity bills but also lowering the load on power plants. Generally, multiple solar photovoltaic (PV) modules are installed for power generation and may include one primary solar PV module and a secondary solar PV module. When supplying power, the primary solar PV module is given with the highest priority in supplying power first. The secondary solar PV module will not supply power until the primary solar PV module uses up its power. Such way of power supply ends up with less operational flexibility to the solar PV modules and shorter life duration of the primary solar PV module.

Current hybrid electric cars are usually equipped with two electric power sources, one of which is a rechargeable battery selected from a nickel metal hydride battery or a lithium ion battery, and the other electric power source is either the alternator driven by the engine or a fuel cell. During operation, one of the electric power sources is selected as a primary electric power source based on operational conditions. For example, when the hybrid electric car is driven at a low speed (e.g. below 40 km/hr), the rechargeable battery is chosen as the primary electric power source to drive the vehicle, and when driven at a high speed (e.g. above 40 km/hr), the engine or the fuel cell is chosen as the power source to drive the vehicle. As far as the choices of electric power sources are concerned, such arrangement is very inflexible. Besides, the primary electric power source selected at the discretion of vehicle speed may result in single electric power source in use for power supply, which is prone to damage and deterioration thereto and a low power supply efficiency.

SUMMARY OF THE INVENTION

An objective of the present invention is to provide a power distribution system using multiple power sources and a method for distributing power using multiple power sources, which are implemented through creation of an output power reference table for multiple rechargeable power units for the rechargeable power units to supply power to a load according to power distribution information and a power setting value corresponding to a consumed power value of the load from the output power reference table, for assurance of enhanced power utilization.

To achieve the foregoing objective, the method distributing power using multiple rechargeable power sources is performed by a control device connected with multiple rechargeable power units, and the method includes:

creating an output power reference table according to multiple power setting values and an output power range and battery efficiency of each rechargeable power unit, wherein the output power reference table includes the multiple power setting values and multiple pieces of power distribution information corresponding to the respective power setting values, wherein each piece of power distribution information has multiple output power values of the multiple rechargeable power units associated with a corresponding power setting value;

receiving a consumed power value of a load and selecting one of the multiple power setting values and one of the multiple pieces of power distribution information corresponding to the consumed power value from the output power reference table; and controlling the multiple rechargeable power units to simultaneously supply power to the load according to the multiple output power values of the selected piece of power distribution information.

As can be seen from the foregoing method, the output power reference table can be created based on the power setting values and output power ranges and battery efficiencies of the multiple rechargeable power units. When receiving the consumed power value of the load, the control device selects the power distribution information from the output power reference table and controls the multiple rechargeable power units to simultaneously supply power to the load according to the power distribution information. Therefore, the issue of rapid deterioration of solitary rechargeable power unit and inflexible power supply can be mitigated to achieve enhanced power utilization efficiency with multiple rechargeable power units.

To achieve the foregoing objective, the power distribution system includes multiple rechargeable power units, a power distribution board, a power converter and a control device.

Each rechargeable power unit has a rechargeable power source and a power regulator.

The rechargeable power source stores or outputs DC (Direct Current) power.

The power regulator is electrically connected to the rechargeable power source to regulate the DC power outputted from the rechargeable power source.

The power distribution board is electrically connected to the power regulators of the multiple rechargeable power units to converge the DC power received from the rechargeable power sources.

The power converter is electrically connected to the power distribution board, converts the DC power received from the power distribution board into AC (Alternating Current) power, and supplies the AC power to a load.

The control device is electrically connected to the multiple power regulators and the load.

The control device creates an output power reference table according to multiple power setting values and an output power range and battery efficiency of each rechargeable power unit, wherein the output power reference table includes the multiple power setting values and multiple pieces of power distribution information corresponding to the respective power setting values, and each piece of power distribution information has multiple output power values corresponding to the respective rechargeable power sources.

The control device selects the power setting value and the piece of power distribution information from the output power reference table according to a consumed power value of the load and controls the power regulators of the multiple rechargeable power units to regulate power according to the selected piece of power distribution information for the multiple rechargeable power sources to simultaneously supply power according to the multiple output power values of the selected piece of power distribution information to the load.

As can be seen from the foregoing power distribution system, the control device creates the output power reference table. In response to a consumed power of the load, the control device selects the power setting value and the power distribution information corresponding to the consumed power from the output power reference table and controls the power regulators to adjust power for the multiple rechargeable power units to simultaneously supply power to the load according to the power distribution information. Therefore, the issue of rapid deterioration of solitary rechargeable power unit and inflexible power supply can be mitigated to achieve enhanced power utilization efficiency with multiple rechargeable power units.

Other objectives, advantages and novel features of the invention will become more apparent from the following detailed description when taken in conjunction with the accompanying drawings.

DETAILED DESCRIPTION OF THE INVENTION

Figure 1:
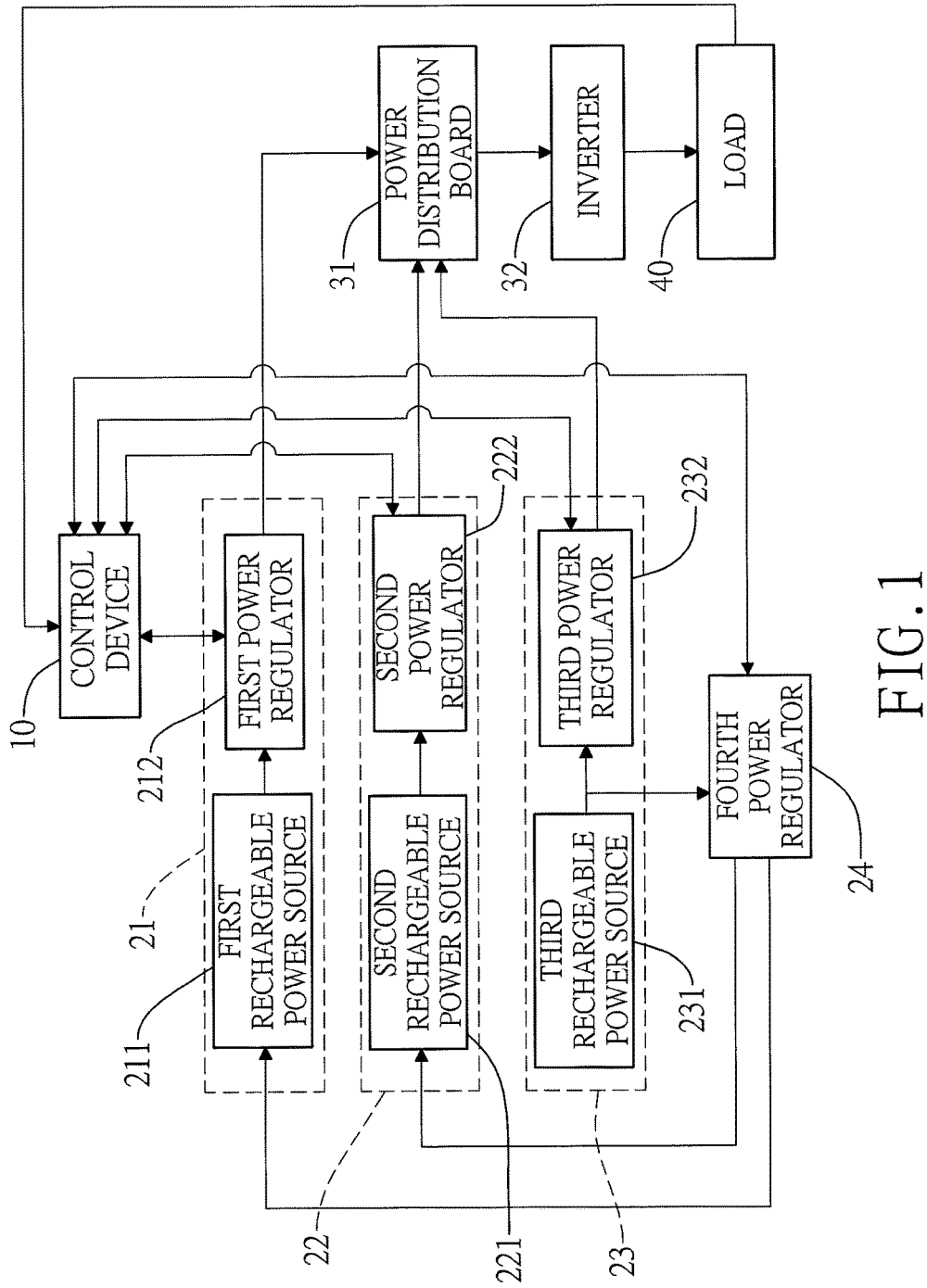
FIG. 1 is a functional block diagram of a power distribution system using multiple rechargeable power sources in accordance with the present invention.

With reference to FIG. 1, a power distribution system using multiple rechargeable power sources in accordance with the present invention includes a control device 10, multiple rechargeable power units, a power distribution board 31 and a power converter 32. The multiple rechargeable power units include a first rechargeable power unit 21, a second rechargeable power unit 22 and a third rechargeable power unit 23. The control device 10 is electrically connected to the first rechargeable power unit 21, the second rechargeable power unit 22, the third rechargeable power unit 23 and a load 40. The power distribution board 31 is electrically connected to the first rechargeable power unit 21, the second rechargeable power unit 22 and the third rechargeable power unit 23 and the power converter 32. The power converter 32 is electrically connected to the load 40. In the present embodiment, the load may be exemplified by an electric car motor but is not limited thereto. The power distribution system using multiple rechargeable power sources can be applied to household power distribution using multiple rechargeable power sources or power distribution of electric cars using multiple rechargeable power sources.

The first rechargeable power unit 21 includes a first rechargeable power source 211 and a first power regulator 212. The first power regulator 212 is electrically connected to the control device 10 and the first rechargeable power source 211, may be a lithium ion battery, and regulates the power outputted from the first rechargeable power source 211.

The second rechargeable power unit 22 includes a second rechargeable power source 221 and a second power regulator 222. The second power regulator 222 is electrically connected to the control device 10 and the second rechargeable power source 221, may be a super capacitor, and regulates the power outputted from the second rechargeable power source 221.

The third rechargeable power unit 23 includes a third rechargeable power source 231 and a third power regulator 232. The third power regulator 232 is electrically connected to the control device 10 and the third rechargeable power source 231, may be a fuel cell, and regulates the power outputted from the third rechargeable power source 231.

The power distribution board 31 serves as a power bus to output power to the power converter 32. The power converter 32 converts received DC (Direct Current) power into AC (Alternating Current) power and supplies the AC power to the load 40.

When the power distribution system is operated, the control device 10 receives a power-consuming value from the load 40 and maps power distribution information corresponding to the power-consuming value in a preset output power reference table to supply power simultaneously allocated from the first rechargeable power source 211, the second rechargeable power source 221 and the third rechargeable power source 231 to the load 40 according to the power distribution information. The way of creating the output power reference table is explained as follows.

The control device 10 configures multiple power setting values in the form of an array Pdm with elements thereof [Pdm_1 Pdm_2 Pdm_3 . . . Pdm_n] arranged in an ascending order. The multiple power setting values are inputted by a manager of the power distribution system or are configured based on a load range between a minimum power to a maximum power to the load 40. For example, supposing that the load range is in a range of 0~100 kW and there are twenty power setting values within the power range indicating that an interval between each adjacent two of the twenty power setting values is 5 kW, the power setting values are represented by Pdm_1=5 kW, Pdm_2=10 kW, Pdm_3=15 kW, . . . , Pdm_20=100 kW.

The control device 10 allocates power from the first rechargeable power source 211, the second rechargeable power source 221 and the third rechargeable power source 231 according to the power setting values. During operation, the control device 10 can be connected to the first rechargeable power source 211, the second rechargeable power source 221 and the third rechargeable power source 231 via a power management circuit to acquire status information of the first rechargeable power source 211, the second rechargeable power source 221 and the third rechargeable power source 231. First of all, the control device 10 configures multiple first output power values within an output power range of the first rechargeable power source 211 in the form of an array Pbatt with elements thereof [Pbatt_1 Pbatt_2 Pbatt_3 . . . Pbatt_n] arranged in an ascending order and multiple second output power values within an output power range of the second rechargeable power source 221 in the form of an array Psc with elements thereof [Psc_1 Psc_2 Psc_3 . . . Psc_n] arranged in an ascending order. The index "n" in Pbatt_nn and Psc_nn represents the sequence number of the first output power value in the array Pbatt and the sequence number of the second output power value in the array Psc.

The control device 10 sequentially selects one of the multiple power setting values to configure power allocated from the first rechargeable power source 211, the second rechargeable power source 221 and the third rechargeable power source 231 for supplying the power to the load 40. After selecting a first power setting value Pdm_1 and pairing one of the first output power values in the array Pbatt, for example Pbatt_11, with each second output power value in the array Psc, the control device 10 deducts the first output power value Pbatt_11 and each second output power in the array Psc pairing with the first output power value Pbatt_11 from the first power setting value Pdm_1 to acquire multiple third output power values arranged in the form of an array Pfc represented by [Pfc_111 Pfc_122 Pfc_133 ... Pfc_1nn] with elements thereof indicating third output power values required by the third rechargeable power source 231 and pairing with the first output power value Pbatt_1 and the respective second output power values in the array Psc for supplying power to the load 40. The array Pfc can be considered as a three-dimensional matrix and Pfc_1nn is an element of the matrix. The Index "1" in Pfc_1nn represents the sequence number of the first output power value Pbatt_1 in the array Pbatt, the heading index "n" in Pfc_1nn represents the sequence number of the second output power value Psc_n in the array Psc, and the trailing index "n" in Pfc_1nn represents the sequence number of the third output power value Pfc_1nn in the array Pfc. In the case of the third output power Pfc_1nn, a pairing combination for supplying power to the load 40 based on the first output power value, the second output power and the third output power value can thus be formed by including Pbatt_1, Psc_n and Pfc_1nn. After the pairing combinations involved with the first output power value Pbatt_1 are done, the pairing combinations involved with the subsequent first output power values can be sequentially performed until no element in the array Pbatt can be selected. Likewise, when the first output power value Pbatt_n in the array Pbatt is selected to pair with each second output power value in the array Psc, the resultant array Pfc is calculated and represented by [Pfc_n11 Pfc_n22 Pfc_n33 ... Pfc_nnn] and a pairing combination associated with Pfc_nnn is formed by Pbatt_n, Psc_n and Pfc_mm. After the pairing combinations involved with all elements in the array Pbatt are completed, the pairing combinations associated with Pdm_1 are then completed, and a next element in the array Pdm is selected to generate all the pairing combinations associated therewith as performed earlier until no element in the array Pdm can be selected.

Moreover, in consideration of the third rechargeable power source 231 with an output power upper limit, the control device 10 adds a penalty power value to each third output power value that is greater than the output power upper limit. The penalty power value is an infinite power value far greater than each of the multiple first output power values, the multiple second output power values and the multiple third output power values.

As each rechargeable power source is susceptible to operational temperature, residual capacity, state of health (i.e. internal resistance) or output current of the rechargeable power source, a battery efficiency or power consumed by the rechargeable power source to reach the configured output power value varies from one rechargeable power source to another rechargeable power source. Hence, in each pairing combination the control device 10 divides the first output power value in the pairing combination by a first battery efficiency of the first rechargeable power source 211, divides the second output power value in the pairing combination by a second battery efficiency of the second rechargeable power source 221, and divides the third output power value in the pairing combination by a third battery efficiency of the third rechargeable power source 231 to respectively acquire a corrected first output power value, a corrected second output power value and a corrected third output power value. The sum of the corrected first output power value, the corrected second output power value and the corrected third output power value in the pairing combination is equal to a power total value J, which is recorded.

The control device 10 selects one of the power total values J of the pairing combinations associated with the first power setting value selected in the array Pdm, which has a minimum value, and configures the first output power value, the second output power value and the third output power value of the pairing combination with the minimum power total value J as the power distribution information pertinent to the first power setting value. After configuration of the power distribution information pertinent to the currently-selected first power setting value in the array Pdm is completed, the control device 10 sequentially performs calculation of the minimum power total values J and configuration of the power distribution information pertinent to the remaining power setting values of the array Pdm until no element in the array Pdm can be selected, and creates the output power reference table containing the minimum power total values and the power distribution information pertinent to the respective power setting values. A mapping relationship between the multiple power setting values [Pdm_1 Pdm_2 Pdm_3 ... Pdm_n] and the corresponding minimum power total values [$J_1$ $J_2$ $J_3$ ... $J_n$] is then established.

The output power reference table can be listed as follows:

| Power setting value | Min. power total value | Power distribution info. |
|---|---|---|
| Pdm_1 | $J_1$ | Pbatt_$i_1$, Psc_$j_1$, Pfc_$k_1$ |
| Pdm_2 | $J_2$ | Pbatt_$i_2$, Psc_$j_2$, Pfc_$k_2$ |
| Pdm_3 | $J_3$ | Pbatt_$i_3$, Psc_$j_3$, Pfc_$k_3$ |
| ... | ... | |
| Pdm_n | $J_n$ | Pbatt_$i_n$, Psc_$j_n$, Pfc_$k_n$ |

In the output power reference table the power distribution information corresponding to each power setting value Pdm_n is the first output power value Pbatt_$i_n$, the second output power value Psc_$j_n$ and the third output power value Pfc_$k_n$ associated with the minimum power total $J_n$, Pbatt_$i_n$ represent the $i^{th}$ element in the array Pbatt associated with the power setting value Pdm_n, Psc_$j_n$ represents the $j^{th}$ element in the array Psc associated with the power setting value Pdm_n, and Pfc_$k_n$ represents the $k^{th}$ element in the array Pfc associated with the power setting value Pdm_n and pairing with the $i^{th}$ element Pbatt_$i_n$ in the array Pbatt and the $j^{th}$ element Psc_$j_n$ in the array Psc.

When the power distribution system starts operating, the control device 10 receives a consumed power value of the load 40. For example, supposing that the consumed power value matches the power setting value Pdm_1, the control device 10 selects the power distribution information Pbatt_$i_1$, Psc_$j_1$ and Pfc_$k_1$ corresponding to the power setting value Pdm_1, and respectively configures the first rechargeable power unit 21, the second rechargeable power unit 22 and the third rechargeable power unit 23 to output corresponding power flowing together to the power distribution board 31 according to the first output power value Pbatt_$i_1$, the second output power value Psc_$j_1$ and the third output power value Pfc_$k_1$. The power converged to the power distribution board 31 is further outputted from the power distribution board 31 to the power converter 32 and converted by the power converter 32 into AC power as operating power to the load 40.

Based on the foregoing description, an equation for calculating the power total can be derived as follows:

$$J = \frac{Pbatt}{\eta batt(SOCbatt,\ Ibatt,\ SOHbatt,\ Tbatt)} + \frac{Psc}{\eta sc(SOCsc,\ Isc)} + \frac{Pfc + Pacc}{\eta fc(SOCfc,\ Ifc,\ Tfc)}$$

where

J: Power total value;

Pbatt: First output power value of the first rechargeable power source 211;

ηbatt: First t battery efficiency of the first rechargeable power source 211;

SOCbatt: SOC of the first rechargeable power source 211, SOC being the abbreviation of State of Charge standing for residual power;

Ibatt: Current value of the first rechargeable power source 211;

SOHbatt: SOH of the first rechargeable power source 211, SOH being the abbreviation of State of Health standing for a figure of the condition of a battery compared to its ideal conditions;

Tbatt: Operating temperature of the first rechargeable power source 211;

Psc: Second output power value of the second rechargeable power source 221;

ηsc: Second battery efficiency of the second rechargeable power source 221;

SOCsc: SOC of the second rechargeable power source 221;

Isc: Current value of the second rechargeable power source 221;

Pfc: Third output power value of the third rechargeable power source 231;

Pacc: Operational power consumption of the third rechargeable power source 231. As the third rechargeable power source 231 is a fuel cell, there is power consumption in operation;

ηfc: Third battery efficiency of the third rechargeable power source 231;

SOCfc: SOC of the third rechargeable power source 231;

Ifc: Current value of the third rechargeable power source 231;

Tfc: Operating temperature of the third rechargeable power source 211.

An equation for calculating ηbatt is given as follows:

$$\eta batt = \frac{Pbatt}{Pbatt + Ibatt^2 Rbatt}$$

where

Rbatt: Internal resistance of the first rechargeable power source 211.

An equation for calculating the Rbatt is given as follows:

Rbatt=α1SOCbatt(SOHbatt,Tbatt)$^2$+α2SOCbatt(SOHbatt,Tbatt)+α3 where

α1: First constant for setting battery characteristics of the first rechargeable power source 211;

α2: Second constant for setting battery characteristics of the first rechargeable power source 211;

α3: Third constant for setting battery characteristics of the first rechargeable power source 211.

A characteristics reference table is created according to battery characteristics of the first rechargeable power source 211. By referring to the characteristics reference table, the first constant α1, the second constant α2 and the third constant α3 can be obtained.

An equation for calculating ηsc is given as follows:

$$\eta sc = \frac{Psc}{Psc + Isc^2 Rsc}$$

where

Rsc : Internal resistance of the second rechargeable power source 221 susceptible to SOC and operating temperature of the second rechargeable power source 221.

An equation for calculating ηfc is given as follows:

$$\eta fc = \frac{Pfc}{Pfc + Vfc(Tfc,\ Pafc)Ifc}$$

where

Vfc: Voltage of the third rechargeable power source 231 in operation that is susceptible to SOC and operating temperature Tfc and operating air pressure Pafc of the second rechargeable power source 221.

When the output power reference table is created, references to ranges of the output power values of all the rechargeable power sources are made to identify the optimal power for power supply. Thus, the first rechargeable power source 211, the second rechargeable power source 221 and the third rechargeable power source 231 can supply power to the load 40 in a most efficient manner to mitigate the damage arising from aging to a rechargeable power source serving as the only one for power supply. Sharing power supplied from all rechargeable power sources based on output power ranges thereof to the load can also enhance flexibility in supplying power, thereby attaining the goal of raising the utilization efficiency of multiple rechargeable power sources in power distribution.

The power distribution system further includes a fourth power regulator 24 electrically connected to the first rechargeable power source 211, the second rechargeable power source 221, the third rechargeable power source 231 and the control device 10. When the power distribution system is applied to a vehicle and the vehicle is in an accelerating state, the control device 10 controls the fourth power regulator 24 for the third rechargeable power source 231 to simultaneously charge the first rechargeable power source 211 through the fourth power regulator 24. When the vehicle is in a constant-speed cruise state, the control device 10 controls the fourth power regulator 24 for the third rechargeable power source 231 to simultaneously charge the second rechargeable power source 221 through the fourth power regulator 24.

Figure 2:
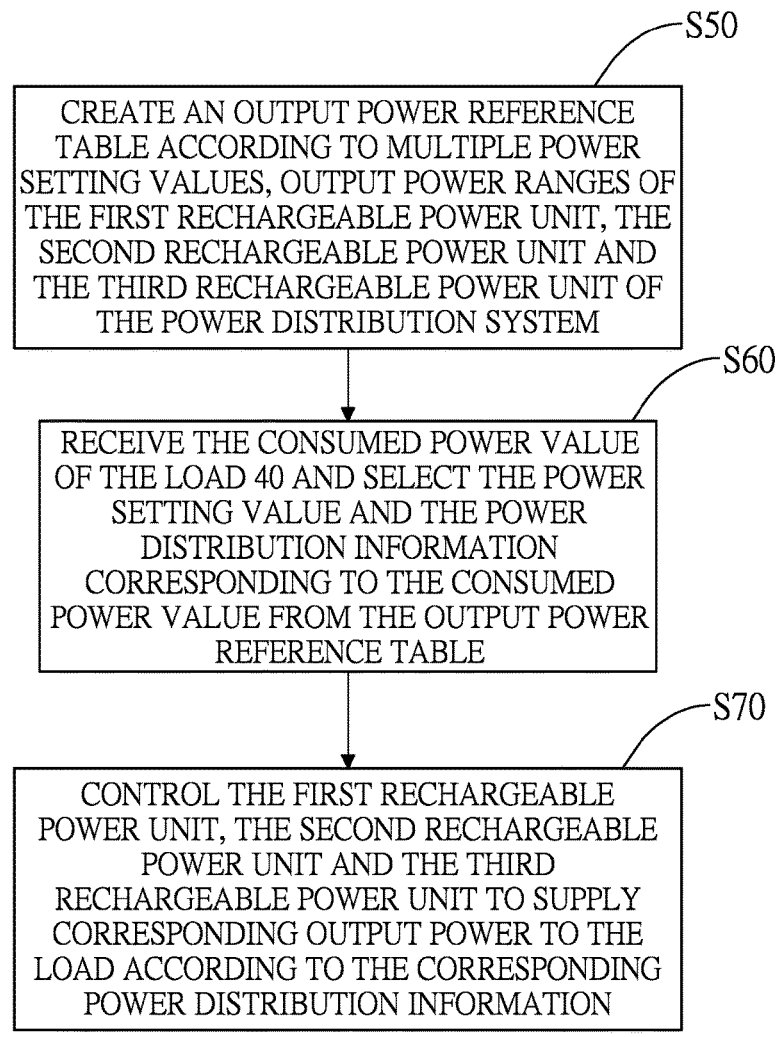
FIG. 2 is flow diagram of a method for distributing power using multiple rechargeable power sources in accordance with the present invention.

With reference to FIG. 2, a method for distributing power using multiple rechargeable power sources is performed by the control device 10 of the foregoing power distribution system and includes the following steps.

Step S50: Create an output power reference table according to multiple power setting values, output power ranges of the first rechargeable power unit 21, the second rechargeable power unit 22 and the third rechargeable power unit 23 of the power distribution system. The output power reference table has the multiple power setting values and power distribution information corresponding to the respective power setting values.

Step S60: Receive the consumed power value of the load 40 and select the power setting value and the power distribution information corresponding to the consumed power value from the output power reference table.

Step S70: Control the first rechargeable power unit 21, the second rechargeable power unit 22 and the third rechargeable power unit 23 to supply corresponding output power to the load 40 according to the corresponding power distribution information.

Figure 3:
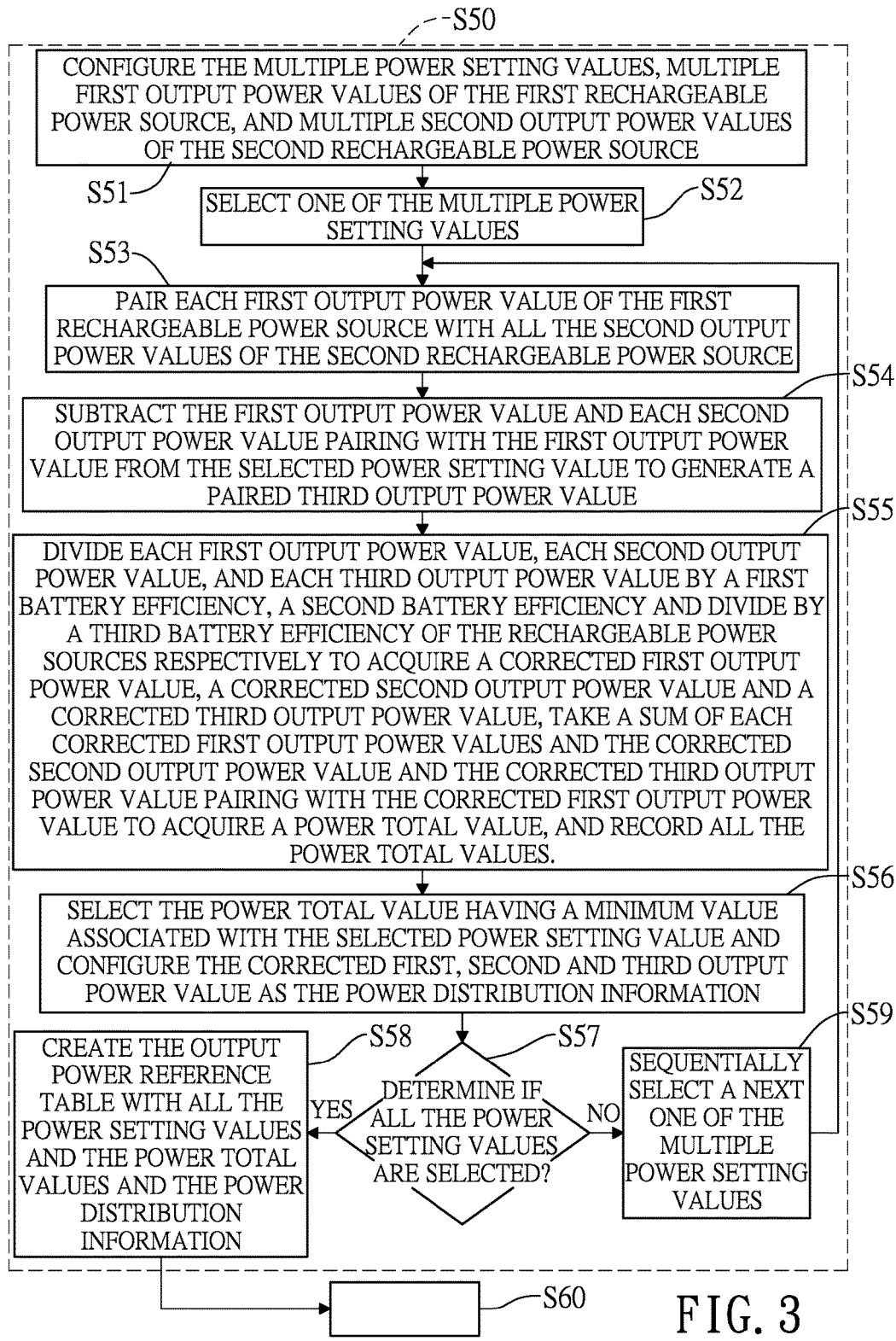
FIG. 3 is another flow diagram of the method in FIG. 2.

With reference to FIG. 3, the step S50 further includes the following steps.

Step S51: Configure the multiple power setting values, multiple first output power values of the first rechargeable power source 211, and multiple second output power values of the second rechargeable power source 221.

Step S52: Select one of the multiple power setting values.

Step S53: Pair each first output power value of the first rechargeable power source 211 with all the second output power values of the second rechargeable power source 221.

Step S54: Subtract the first output power value of the first rechargeable power source 211 and each second output power value pairing with the first output power value from the selected power setting value to generate a paired third output power value of the third rechargeable power source 231;

Step S55: Divide each first output power value by a first battery efficiency of the first rechargeable power source 211, divide each second output power value by a second battery efficiency of the second rechargeable power source 221, and divide each third output power value by a third battery efficiency of the third rechargeable power source 231 to respectively acquire a corrected first output power value, a corrected second output power value and a corrected third output power value, take a sum of each corrected first output power value and the corrected second output power value and the corrected third output power value pairing with the corrected first output power value to acquire a power total value, and record all the power total values.

Step S56: Select the power total value having a minimum value associated with the selected power setting value and configure the corrected first output power value, the corrected second output power value and the corrected third output power value as the power distribution information.

Step S57: Determine if all the power setting values are selected. If positive, perform step S58 and then step S60. Otherwise, perform step S59.

Step S58: Create the output power reference table with all the power setting values and the power total values and the power distribution information corresponding to the respective power setting values.

Step S59: Sequentially select a next one of the multiple power setting values and resume step S53.

Moreover, when the power distribution system is not required to supply power to the load 40, for example, a parking state for charging, the first rechargeable power source 211, the second rechargeable power source 221 and the third rechargeable power source 231 are fully charged or filled up with gas, the method for distributing power using multiple rechargeable power sources is performed again according to the SOC or SOH of the first rechargeable power source 211, the second rechargeable power source 221 and the third rechargeable power source 231 to generate an updated output power reference table, thereby increasing utilization efficiency of distributed power.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A method for distributing power using multiple rechargeable power sources performed by a control device connected with multiple rechargeable power units, the method comprising:
    creating an output power reference table according to multiple power setting values and an output power range and battery efficiency of each rechargeable power unit, wherein the output power reference table includes the multiple power setting values and multiple pieces of power distribution information corresponding to the respective power setting values, wherein each piece of power distribution information has multiple output power values of the multiple rechargeable power units associated with a corresponding power setting value;
    receiving a consumed power value of a load and selecting one of the multiple power setting values and one of the multiple pieces of power distribution information corresponding to the consumed power value from the output power reference table; and
    controlling the multiple rechargeable power units to simultaneously supply power to the load according to the multiple output power values of the selected piece of power distribution information.

2. The method as claimed in claim 1, wherein the multiple rechargeable power units include a first rechargeable power unit, a second rechargeable power unit and a third rechargeable power unit, and the first rechargeable power unit has a first rechargeable power source, the second rechargeable power unit has a second rechargeable power source, and the third rechargeable power unit has a third rechargeable power source;
    wherein the step of creating the output power reference table further comprises:
    configuring the multiple power setting values, multiple first output power values of the first rechargeable power source, and multiple second output power values of the second rechargeable power source;
    selecting one of the multiple power setting values;
    pairing each first output power value of the first rechargeable power source with all the second output power values of the second rechargeable power source;
    subtracting the first output power value of the first rechargeable power source and each second output power value pairing with the first output power value from the selected power setting value to generate a paired third output power value of the third rechargeable power source;
    dividing each first output power value by a first battery efficiency of the first rechargeable power source, dividing each second output power value by a second battery efficiency of the second rechargeable power source, and dividing each third output power value by a third battery efficiency of the third rechargeable power source to respectively acquire a corrected first output power value, a corrected second output power value and a corrected third output power value, taking a sum of each corrected first output power value and the corrected second output power value and the corrected third output power value pairing with the corrected first output power value to acquire a power total value, and recording all the power total values;

selecting the power total value having a minimum value associated with the selected power setting value and configuring the corrected first output power value, the corrected second output power value and the corrected third output power value as the power distribution information;

determining if all the power setting values are selected;

if determining that all the power setting values are selected, creating the output power reference table with all the power setting values and the power total values and the power distribution information corresponding to the respective power setting values; and if determining that not all the power setting values are selected, sequentially selecting a next one of the multiple power setting values and resuming the step of pairing each first output power value of the first rechargeable power source.

3. The method as claimed in claim 2, wherein an equation for calculating the power total value is given by:

$$J = \frac{Pbatt}{\eta batt(SOCbatt, Ibatt, SOHbatt, Tbatt)} + \frac{Psc}{\eta sc(SOCsc, Isc)} + \frac{Pfc + Pacc}{\eta fc(SOCfc, Ifc, Tfc)}$$

where
j: power total value;
Pbatt: first output power value of the first rechargeable power source;
$\eta$batt: first battery efficiency of the first rechargeable power source;
SOCbatt: SOC (State of Charge) of the first rechargeable power source;
Ibatt: current value of the first rechargeable power source;
SOHbatt: SOH (State of Health) of the first rechargeable power source;
Tbatt: operating temperature of the first rechargeable power source;
Psc: second output power value of the second rechargeable power source;
$\eta$sc: second battery efficiency of the second rechargeable power source;
SOCsc: SOC of the second rechargeable power source;
Isc: current value of the second rechargeable power source;
Pfc: third output power value of the third rechargeable power source;
Pacc: operational power consumption of the third rechargeable power source;
$\eta$fc: third battery efficiency of the third rechargeable power source;
SOCfc: SOC of the third rechargeable power source;
Ifc: current value of the third rechargeable power source;
Tfc: operating temperature of the third rechargeable power source.

4. The method as claimed in claim 3, wherein an equation for calculating the first battery efficiency $\eta$batt is given by:

$$\eta batt = \frac{Pbatt}{Pbatt + Ibatt^2 Rbatt}$$

where
Rbatt: internal resistance of the first rechargeable power source;
wherein an equation for calculating the Rbatt is given by:

Rbatt=$\alpha$1SOCbatt(SOHbatt,Tbatt)$^2$+$\alpha$2SOCbatt(SOHbatt,Tbatt)+$\alpha$3 where
$\alpha$1: first constant for setting battery characteristics of the first rechargeable power source;
$\alpha$2: second constant for setting battery characteristics of the first rechargeable power source;
$\alpha$3: third constant for setting battery characteristics of the first rechargeable power source.

5. The method as claimed in claim 4, wherein an equation for calculating the second battery efficiency $\eta$sc is given by:

$$\eta sc = \frac{Psc}{Psc + Isc^2 Rsc}$$

where
Rsc: internal resistance of the second rechargeable power source.

6. The method as claimed in claim 5, wherein an equation for calculating the third battery efficiency $\eta$fc is given by:

$$\eta fc = \frac{Pfc}{Pfc + Vfc(Tfc, Pafc)Ifc}$$

where
Vfc: voltage of the third rechargeable power source in operation.

7. A power distribution system using multiple rechargeable power sources, comprising:
multiple rechargeable power units, each rechargeable power unit having:
a rechargeable power source storing or outputting DC (Direct Current) power; and
a power regulator electrically connected to the rechargeable power source to regulate the DC power outputted from the rechargeable power source;
a power distribution board electrically connected to the power regulators of the multiple rechargeable power units to converge the DC power received from the rechargeable power sources;
an inverter electrically connected to the power distribution board, converting the DC power received from the power distribution board into AC (Alternating Current) power, and supplying the AC power to a load; and
a control device electrically connected to the multiple power regulators and the load;
wherein
the control device creates an output power reference table according to multiple power setting values and an output power range and battery efficiency of each rechargeable power unit, wherein the output power reference table includes the multiple power setting values and multiple pieces of power distribution information corresponding to the respective power setting values, and each piece of power distribution information has multiple output power values corresponding to the respective rechargeable power sources;

the control device selects the power setting value and the piece of power distribution information from the output power reference table according to a consumed power value of the load and controls the power regulators of the multiple rechargeable power units to regulate power according to the selected piece of power distribution information for the multiple rechargeable power sources to simultaneously supply power according to the multiple output power values of the selected piece of power distribution information to the load.

8. The power distribution system as claimed in claim 7, wherein the multiple rechargeable power units include a first rechargeable power unit, a second rechargeable power unit and a third rechargeable power unit, and the first rechargeable power unit has a first rechargeable power source, the second rechargeable power unit has a second rechargeable power source, and the third rechargeable power unit has a third rechargeable power source;

wherein the control device configures the multiple power setting values, multiple first output power values of the first rechargeable power source, and multiple second output power values of the second rechargeable power source, sequentially selects one of the multiple power setting values, pairs each first output power value of the first rechargeable power source with all the second output power values of the second rechargeable power source, subtracts the first output power value of the first rechargeable power source and each second output power value pairing with the first output power value from the selected power setting value to generate a paired third output power value of the third rechargeable power source, divides each first output power value by a first battery efficiency of the first rechargeable power source, divides each second output power value by a second battery efficiency of the second rechargeable power source, and divides each third output power value by a third battery efficiency of the third rechargeable power source to respectively acquire a corrected first output power value, a corrected second output power value and a corrected third output power value, takes a sum of each corrected first output power value and the corrected second output power value and the corrected third output power value pairing with the corrected first output power value to acquire a power total value, records all the power total values, selects the power total value having a minimum value associated with the selected power setting value and configures the corrected first output power value, the corrected second output power value and the corrected third output power value as the power distribution information, and creates the output power reference table with all the power setting values and the power total values and the power distribution information corresponding to the respective power setting values.

9. The power distribution system as claimed in claim 8, wherein an equation for calculating the power total value is given by:

$$J = \frac{Pbatt}{\eta batt(SOCbatt, Ibatt, SOHbatt, Tbatt)} + \frac{Psc}{\eta sc(SOCsc, Isc)} + \frac{Pfc + Pacc}{\eta fc(SOCfc, Ifc, Tfc)}$$

where
  J: power total value;
  Pbatt: first output power value of the first rechargeable power source;
  $\eta$batt: first battery efficiency of the first rechargeable power source;
  SOCbatt: SOC (State of Charge) of the first rechargeable power source;
  Ibatt: current value of the first rechargeable power source;
  SOHbatt: SOH (State of Health) of the first rechargeable power source;
  Tbatt: operating temperature of the first rechargeable power source;
  Psc: second output power value of the second rechargeable power source;
  $\eta$sc: second battery efficiency of the second rechargeable power source;
  SOCsc: SOC of the second rechargeable power source;
  Isc: current value of the second rechargeable power source;
  Pfc: third output power value of the third rechargeable power source;
  Pacc: operational power consumption of the third rechargeable power source;
  $\eta$fc: third battery efficiency of the third rechargeable power source;
  SOCfc: SOC of the third rechargeable power source;
  Ifc: current value of the third rechargeable power source;
  Tfc: operating temperature of the third rechargeable power source.

10. The power distribution system as claimed in claim 9, further comprising a power regulator electrically connected to the first rechargeable power source, the second rechargeable power source and the third rechargeable power source for the third rechargeable power source to charge the first rechargeable power source and the second rechargeable source.

* * * * *